(12) United States Patent
Corey (10) Patent No.: US 9,584,832 B2
(45) Date of Patent: Feb. 28, 2017

(54) HIGH QUALITY SEAMLESS PLAYBACK FOR VIDEO DECODER CLIENTS

(75) Inventor: Brandon J. Corey, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 887 days.

(21) Appl. No.: 13/347,508

(22) Filed: Jan. 10, 2012

(65) Prior Publication Data
US 2013/0156105 A1  Jun. 20, 2013

Related U.S. Application Data

(60) Provisional application No. 61/576,722, filed on Dec. 16, 2011.

(51) Int. Cl.
| | | |
|---|---|---|
| H04N 7/16 | (2011.01) | |
| H04N 19/67 | (2014.01) | |
| H04N 19/105 | (2014.01) | |
| H04N 19/172 | (2014.01) | |
| H04N 19/132 | (2014.01) | |
| H04N 19/156 | (2014.01) | |
| H04N 19/164 | (2014.01) | |
| H04N 19/40 | (2014.01) | |

(52) U.S. Cl.
CPC ........... *H04N 19/67* (2014.11); *H04N 19/105* (2014.11); *H04N 19/132* (2014.11); *H04N 19/156* (2014.11); *H04N 19/164* (2014.11); *H04N 19/172* (2014.11); *H04N 19/40* (2014.11)

(58) Field of Classification Search
CPC ....... H04N 19/00024; H04N 19/00581; H04N 19/00727; H04N 19/00266; H04N 19/00206; H04N 19/0003; H04N 7/5086; H04N 7/26212; H04N 7/26037
USPC ........... 375/240.16, 240.01, 240.03, 240.12, 375/240.24, 240.25
See application file for complete search history.

(56) References Cited

U.S. PATENT DOCUMENTS

| 6,169,821 | B1* | 1/2001 | Fukunaga et al. ............ 382/239 |
|---|---|---|---|
| 7,733,959 | B2 | 6/2010 | Chiou et al. |
| 7,894,521 | B2 | 2/2011 | Hannuksela |
| 2005/0249285 | A1* | 11/2005 | Chen et al. .............. 375/240.16 |
| 2007/0199011 | A1* | 8/2007 | Zhang et al. ...................... 725/1 |
| 2009/0147853 | A1* | 6/2009 | Dane ..................... H04N 5/145 375/240.16 |
| 2010/0189182 | A1* | 7/2010 | Hannuksela ............. 375/240.25 |
| 2011/0085602 | A1* | 4/2011 | He .......................... 375/240.25 |
| 2011/0090968 | A1* | 4/2011 | Ye ............................ 375/240.24 |
| 2013/0114741 | A1* | 5/2013 | Sullivan et al. ......... 375/240.25 |

* cited by examiner

*Primary Examiner* — Neil Mikeska
(74) *Attorney, Agent, or Firm* — Baker Hostetler LLP (57) ABSTRACT

Embodiments of the present invention provide techniques for efficiently coding video data during circumstances of network congestion, or instances when a decoder is unable to handle incoming video at the intended frame rate. A video coder may code frames of a video sequence according to motion estimation prediction in which each frame of the video sequence is constrained to be coded as one of an I-frame or a P-frame. The video coder may determine for each coded P-frame, a distance from the respective P-frame and a most-recently coded reference frame, and if the distance matches a predetermined threshold distance, the respective P-frame may be marked as a reference frame. The coded video data of the I-frame(s), the reference P-frames and the non-reference P-frames may be transmitted in a channel.

21 Claims, 8 Drawing Sheets

HIGH QUALITY SEAMLESS PLAYBACK FOR VIDEO DECODER CLIENTS

CROSS-REFERENCE TO RELATED APPLICATIONS

The subject application claims benefit of U.S. Provisional Patent Application No. 61/576,722, filed Dec. 16, 2011, which is hereby incorporated by reference in its entirety.

BACKGROUND

The present invention relates to video coding and, in particular, to video coding techniques that conserve bandwidth while at the same time preserving image quality.

Modern video coders typically exploit spatial and/or temporal redundancies in video sequences to reduce the number of bits necessary to represent the video. Coded representations of the video, therefore, are easier to store to transmit over communication networks. The video coders employ a variety of different coding techniques, including intra coding and inter coding. Video decoders receive the encoded video and decode the video so that the video can be displayed on a display device. In some instances, the video decoders may not be as sophisticated as the encoders and may not be able to decode the incoming video at the intended frame rate. In other instances, decoders may not be able to process the incoming video due to network congestion on the decoders' end.

The inventor perceives a need in the art for a video coding system that dynamically adjusts to circumstances of network congestion, or to instances when a decoder is unable to handle incoming video at the intended frame rate by changing decoding schemes.

DETAILED DESCRIPTION

Embodiments of the present invention provide techniques for efficiently coding video data during circumstances of network congestion, or instances when a decoder is unable to handle incoming video at the intended frame rate. According to the embodiments, a video coder may code frames of a video sequence according to motion estimation prediction in which each frame of the video sequence is coded as one of an I-frame or a P-frame. The video coder may determine for each coded P-frame, a distance from the respective P-frame and a most-recently coded reference frame, and if the distance matches a predetermined threshold distance, the respective P-frame may be marked as a reference frame. The coded video data of the I-frames, the reference P-frames and the non-reference P-frames may be transmitted in a channel. A decoder on the video coder's end may decode coded video data of the I-frames and the reference P-frames, and the decoded video data may be stored in a reference picture cache for use in subsequent encoding of other frames of the video sequence.

Other embodiments provide techniques for efficiently decoding and transcoding video data during circumstances of network congestion, or heavy processing load. In an embodiment, a decoder may decode coded frames of a buffered video sequence according to predictive coding techniques. The decoder may decode each coded frame as one of an I-frame or a P-frame. If limited processing resources are available for decoding, the decoder may drop non-reference P-frames from the buffer prior to decoding.

In an embodiment, a transcoder may receive a buffered first channel stream including a) a coded video sequence, consisting of frames coded according to I-coding techniques and P-coding techniques, b) a coded audio sequence, and c) an index identifying correspondence between elements of the coded video sequence and elements of the coded audio sequence. The transcoder may assemble a second channel stream having a lower frame rate than the first channel stream. The second channel stream may include a) a second coded video sequence consisting of only the coded I-frames and coded reference P-frames of the first channel, b) the coded audio sequence and c) a second index identifying correspondence between elements of the second video sequence and elements of the coded audio sequence.

Figure 1:
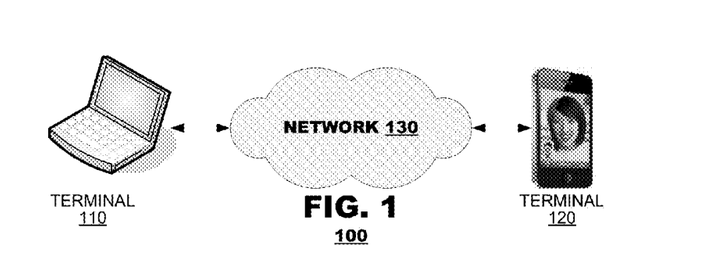
FIG. 1 illustrates a simplified block diagram of a video coding system according to an embodiment of the present invention.

FIG. 1 is a simplified block diagram of a video coding system 100 according to an embodiment of the present invention. The system 100 may include a plurality of terminals 110, 120 interconnected via a network 130. The terminals 110, 120 each may capture video data at a local location and code the video data for transmission to the other terminal via the network 130. Each terminal 110, 120 may receive the coded video data of the other terminal from the network 130, reconstruct the coded data and display video data recovered therefrom.

In FIG. 1, the terminals 110, 120 are illustrated as a laptop and a smart phone respectively, but the principles of the present invention are not so limited. Embodiments of the present invention find application with personal computers (both desktop and laptop computers), tablet computers, computer servers, media players and/or dedicated video conferencing equipment.

The network 130 represents any number of networks that convey coded video data between the terminals 110, 120, including for example wireline and/or wireless communication networks. The communication network 130 may exchange data in circuit-switched or packet-switched channels. Representative networks include telecommunications networks, local area networks, wide area networks and/or the Internet. For the purposes of the present discussion, the architecture and topology of the network 130 are immaterial to the operation of the present invention unless explained herein below.

Figure 2:
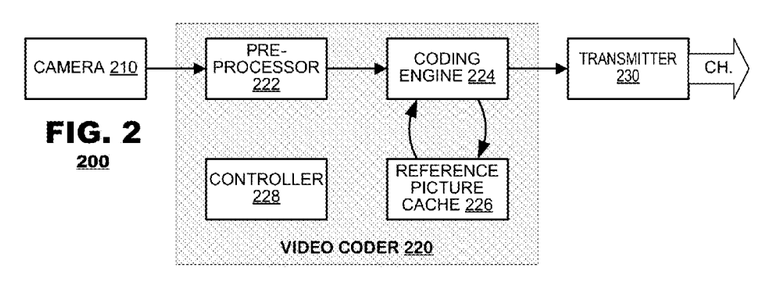
FIG. 2 illustrates a functional block diagram of a video processing system, according to an embodiment of the present invention.

FIG. 2 illustrates a functional block diagram of a video processing system 200 operable within the system 100. The system may include a camera 210, video coder 220 and transmitter 230. The camera 210 may capture video data and generate a video data signal therefrom. The video coder 220 may code the video signal for transmission over the channel. The transmitter 230 may build a channel data signal from the coded video data and other data sources (coded audio data and ancillary data), format the channel data signal for transmission and transmit it to the channel.

As illustrated, the video coder 220 may include a pre-processor 222, a coding engine 224 and a reference picture cache 226 operating under control of a controller 228. The pre-processor 222 may accept the video signal from the camera 210 and may perform various processing operations on the source video to condition it for coding. The coding engine 224 may perform compression operations on the pre-processed source video to reduce spatial and/or temporal redundancies therein. The coding engine 224 may output coded video data to the transmitter 230. As part of its operation, the coding engine 224 also may code new frames of video data according to motion prediction techniques using data stored in the reference picture cache 226 as a prediction reference. The coding engine 224 further may include a decoder to reconstruct coded video data of the reference frames for storage in the reference picture cache 226.

The pre-processor 222 may perform a variety of video processing operations on the source video output from the camera to condition the source video for coding. The pre-processor 222 may include an array of filters (not shown) such as de-noising filters, sharpening filters, smoothing filters, bilateral filters and the like that may be applied dynamically to the source video based on characteristics observed within the video. The pre-processor 222 may review the source video data from the camera and, in cooperation with the controller 228, may select one or more of the filters for application. Typically, the pre-processor 222 conditions the source video data to render compression more efficient or to preserve image quality in light of data losses that may be incurred as the coding engine 224 operates.

The coding engine 224 may code input video data according to a variety of different coding techniques to achieve compression. The coding engine 224 may compress the images by a motion-compensated prediction. Frames of the input video may be assigned a coding type, such as intra-coding (I-coding), or uni-directionally predictive coding (P-coding). The frames further may be parsed into a plurality of pixel blocks and may be coded by transform coding, quantization and entropy coding. Pixel blocks of P-coded frames may be coded according to temporal prediction, in which case, the video coder 220 may perform a motion estimation search to identify pixel blocks from frames stored in the reference picture cache 226 that may provide an adequate prediction reference for pixel blocks of a new frame to be coded. The coding engine 224 may calculate motion vectors identifying pixel blocks of reconstructed frames stored in the reference picture cache 226 that are used as predictions of the pixel blocks being coded and may generate prediction residuals prior to engaging the transform coding. In an embodiment, the video encoder may operate according to I-frame and P-frame coding protocols defined by ITU H.263, H.264 and the like; although the ITU standards also define protocols for B-frame coding, embodiments of the present invention prevent the coding engine 224 from employing such protocols.

The reference picture cache 226 may store a predetermined number of reconstructed reference frames. During coding, the controller 228 may mark frames to be reference frames on a periodic basis. The coding engine 224 may include a decoder (not shown) to reconstruct coded reference picture frames. Thus, the video coder 220 may generate a local copy of the reconstructed reference frames that will be obtained by a video decoder when it reconstructs the coded video data. These reconstructed reference picture frames may be stored in the reference picture cache 226. The reference picture cache 226 may have a predetermined cache depth; for example, video coders 220 operating in accordance with H.264 may store up to sixteen (16) reconstructed reference pictures.

Although not illustrated in FIG. 2, terminal 120 may include functional units to decode coded video data to obtain a reconstructed video sequence. The decoder's functional units may include a receiver to recover channel data received via the channel and a video decoder to invert coding processes performed by the video coder 220. The decoder 220 also may decode coded residual data and merge it with the prediction block to generate a final reconstructed pixel block. Terminal 120 may include other post-processing functional units to condition the reconstructed pixel blocks for display, for example, by applying smoothing filters and the like.

The elements shown in FIG. 2—the camera 210, video coder 220 and transmitter 230—all support delivery of video data in only one direction, from a first terminal to a second terminal (say, from terminal 110 to terminal 120). The principles of the present invention may be extended to bidirectional exchange of video data, in which case the functional blocks illustrated in FIG. 2 may be replicated in both terminals 110, 120.

Figure 3:
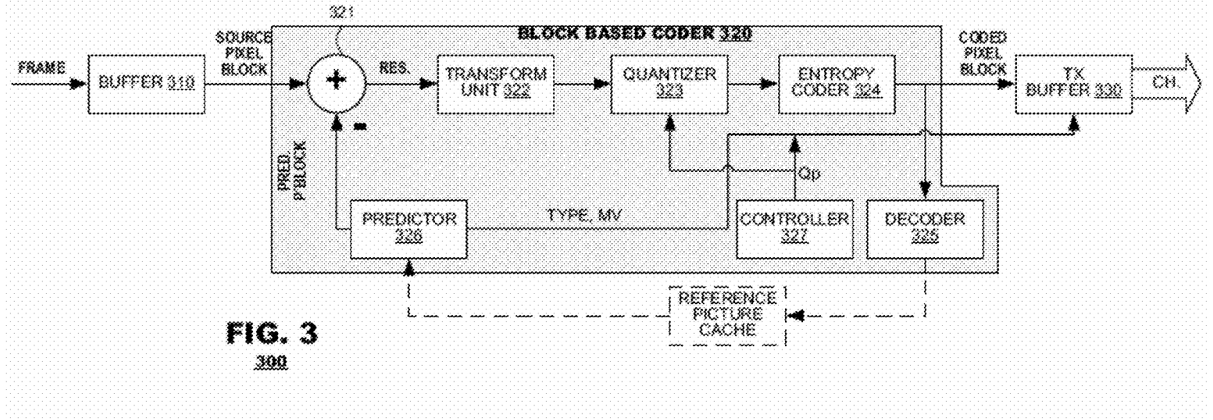
FIG. 3 is a simplified block diagram of functional units operable in a coding engine according to an embodiment of the present invention.

FIG. 3 is a simplified block diagram of functional units operable in a coding engine 300 to code a pixel block according to an embodiment of the present invention. A buffer 310 may receive pixel block data of a frame to be decoded. A source pixel block may be read by block based coder 320 from buffer 310 and coded to obtain a coded pixel block. The coded pixel block may be coded according to I-frame and P-frame coding protocols. Transmit buffer 330 accumulates coded pixel block data and metadata representing pixel block coding order and prediction types applied for the coded pixel blocks. Accumulated data may be formatted and transmitted to a channel.

The block based coder 320 may include a subtractor 321, a transform unit 322, a quantizer unit 323, and entropy coder 324, a reference frame decoder 325, a predictor 326, and a controller 327. Subtractor 321 may generate data representing a difference between the source pixel block and a reference pixel block developed for prediction. The subtractor 321 may operate on a pixel-by-pixel basis, developing residuals at each pixel position over the pixel block. Non-predictively coded blocks may be coded without comparison to reference pixel blocks, in which case the pixel residuals are the same as the source pixel data. Transform unit 322 may convert the source pixel block data to an array of transform coefficients, such as by a discrete cosine transform (DCT) process or a wavelet transform. Quantizer unit 323 may quantize (divide) the transform coefficients obtained from the transform unit 322 by a quantization parameter Qp. Entropy coder 324 may code quantized coefficient data by run-value coding, run-length coding or the like. Data from the entropy coder may be output to the channel as coded video data of the pixel block. Reference frame decoder 325 may decode pixel blocks of reference frames and assemble decoded data for such reference frames. Decoded reference frames may be stored in the reference picture cache. Predictor 326 may perform motion estimation searches to find prediction references for input pixel blocks. The predictor 326 may output predicted pixel blocks to the subtractor 321. The predictor 326 may also output metadata identifying type(s) of predictions performed. Controller 327 may manage coding operation of the coder 320, for example, by selecting quantization parameters for pixel blocks to satisfy a target bit rate for coding.

For inter-prediction coding, the predictor 326 may search among the reference picture cache for pixel block data of previously-coded and decoded reference frames that exhibit strong correlation with the source pixel block. When the motion predictor 326 finds an appropriate prediction reference for the source pixel block, it may generate motion vector data that is output to the decoder as part of the coded video data stream. The motion predictor 326 may retrieve a reference pixel block from the reference cache that corresponds to the motion vector and may output it to the subtractor 321. For intra-prediction coding, the predictor 326 may search among the previously coded and decoded pixel blocks of the same frame being coded for pixel block data that exhibits strong correlation with the source pixel block.

Figure 4:
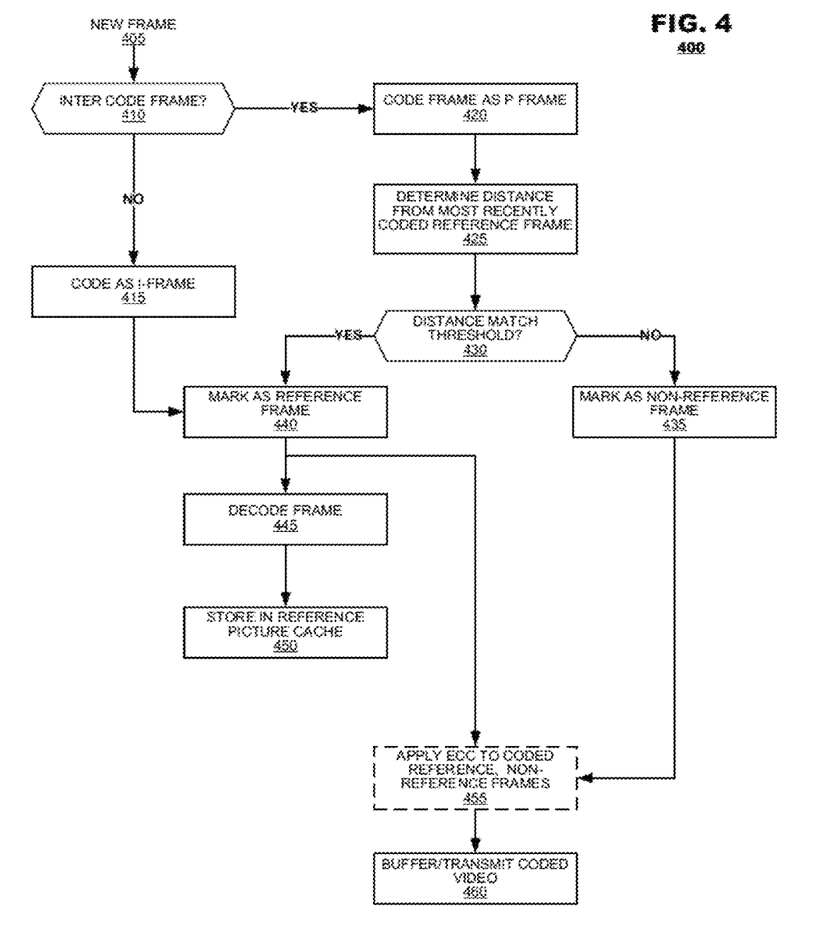
FIG. 4 illustrates a method of controlling coding of frames within a video encoder according to an embodiment of the present invention.

FIG. 4 illustrates a method 400 of controlling coding of frames within a video encoder according to an embodiment of the present invention. According to the method 400, for each new input frame 405, the method 400 may determine whether to code the frame as an I-frame or as a P-frame (box 410). If the input frame is to be intra-coded, the frame may be coded as an I-frame (box 415), marked as a reference frame (box 440), and the coded video data of the frame may be buffered for transmission via the channel (box 460). If the input frame is to be inter-coded, the frame may be coded as a P-frame (box 420). The P-frame's distance to the most recently coded reference frame may be determined (box 425). If the distance matches a threshold distance, the new frame may be marked as a reference frame (box 440), and the coded video data of the frame may be buffered for transmission via the channel (box 460). If the distance does not match a threshold distance, the new frame may be marked as a non-reference frame (box 435), and the coded video data of the frame may be buffered for transmission via the channel (box 460). Both I-frames and P-frames marked as reference frames may also be decoded (box 445) and stored in the reference picture cache (box 450).

A new frame 405 is usually coded as a P-frame (rather than an I-frame) because P-coding generally yields higher degrees of compression than I-coding unless some exception arises. Common exceptions include: a) the first frame of a video sequence generally must be coded as an I-frame because no other reference frame exists to provide a prediction reference, b) a frame following a scene change may be coded as an I-frame, c) I-frames may be inserted into a video sequence to satisfy random access requirements or error resiliency requirements, d) large prediction errors, which may arise when no frame in a reference picture cache provides an adequate prediction reference for a frame, may cause a frame to be coded as an I-frame.

Operation of the method of FIG. 4 increases the range of operations available to a component (such as a decoder) which receives the coded frame data. Depending on factors such as network congestion, or a lack of capability to process the coded data at the incoming rate, the receiving component may drop frames which are not marked as reference frames. FIG. 4 also illustrates an optional operation in which the method may apply error correction coding (ECC) to each coded frame (box 455). More robust error correction may be applied to coded data of reference frames than for coded data of non-reference frames since a component (such as a decoder) receiving the coded frame data may use reference frames for decoding future coded frame data.

Figure 5:
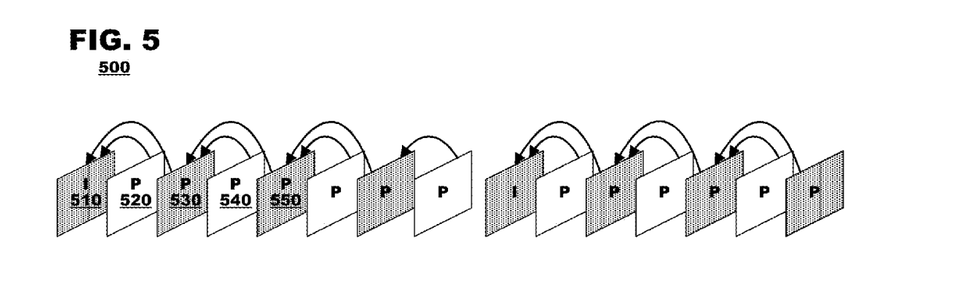
FIG. 5 illustrates the operation of the method of FIG. 4 for an exemplary set of video data.

FIG. 5 illustrates the operation of the method of FIG. 4 for an exemplary set of video data. In FIG. 5, frame 510 is intra coded as an I-frame. Frame 520 may be inter coded as a P-frame. Frame 510 may be used as a reference frame to code P-frame 520. Frame 520 may be marked as a non-reference frame. The next frame, frame 530, may be inter coded as a P-frame. Frame 510 may be used as a reference frame to code P-frame 530. Frame 530 may be marked as a reference frame.

Frame 510 may be coded as an I-frame because it may be the first frame of a video sequence received by an encoder. Frame 510 may also be coded as an I-frame because a scene in a video may have changed such that the frames in a reference picture cache are substantially different from frame 510.

Determining whether a P-frame is marked as a reference frame or a non-reference frame is done by comparing the distance from the currently coded P-frame and the most recently coded reference frame to a threshold distance. In an exemplary embodiment illustrated in FIG. 5, the threshold distance may be set to 2 frames. If the distance (or number of frames) from the currently coded P-frame and the most recently coded reference frame is 2 (the distance threshold), then the currently coded P-frame may be marked as a reference frame. Otherwise, the currently coded reference frame is marked as a non-reference frame. Thus, frame 520 is marked as a non-reference frame because the distance from frame 520 and the most recently coded reference frame (510) is 1 frame, which does not match the threshold distance of 2 frames. Frame 530, however, is marked as a reference frame because the distance from frame 530 and the most recently coded reference frame (510) is 2, which matches the threshold distance of 2. In an embodiment, the threshold distance may be a programmable element that may be set to suit individual application needs. Further, the threshold distance may vary during a video coding session in response to changing network conditions or to estimates of processing load at the decoder which may be communicated to the encoder expressly by the decoder in a communication back channel or may be derived by the encoder from estimates of the decoder's processing capability.

Figure 6:
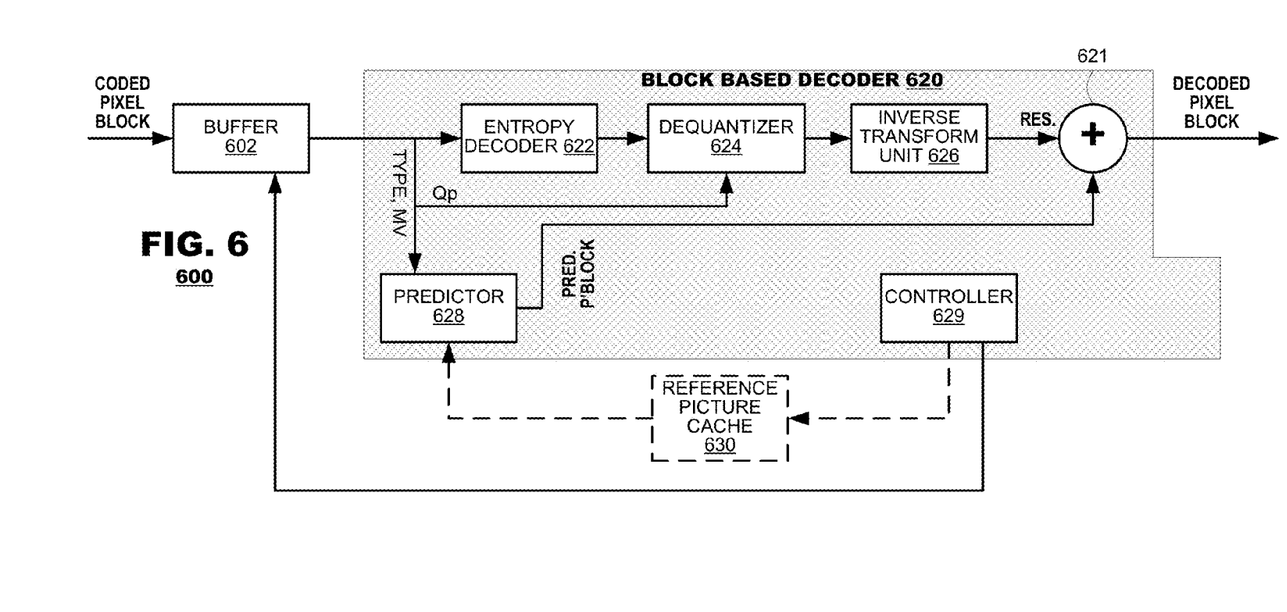
FIG. 6 is a simplified block diagram of functional units operable in a decoding engine to decode a coded pixel block according to an embodiment of the present invention.

FIG. 6 is a simplified block diagram of functional units operable in a decoding engine 600 to decode a coded pixel block according to an embodiment of the present invention. The decoding engine 600 may include a buffer 602 that receives coded pixel block data to be decoded, and a block-based decoder 620. The block-based decoder 620 may include functional units that invert coding processes performed by the encoder. The block-based decoder 620 may include a controller 629 to manage the operation of the decoder, a dequantization unit 624, an inverse transform unit 626, a prediction unit 628, and a reference picture cache 630.

Depending on various factors, the decoder may decide to drop particular frames. The factors may include network congestion, and the technology employed in the block based decoder. The entropy decoder 622 may decode the coded frames by run-value or run-length or similar coding for decompression to recover the truncated transform coefficients for each coded pixel block. The dequantization unit 624 may multiply the transform coefficients by the quantization parameter (Qp) used during encoding to recover the coefficient values. The inverse transform unit 626 may convert the array of coefficients to an array of pixel values, for example, by a discrete cosine transform (DCT) process or wavelet process. For P-coded pixel blocks, the predictor 628 may retrieve a reference pixel block from the reference picture cache 630 based on motion prediction vectors, and may present it to the adder 621. The adder 621 may perform a pixel-by-pixel addition of predicted pixel values from the reference pixel block and residual pixel values from the inverse transform unit 626. The adder 621 may output data representing the decoded pixel block. Reference picture cache 630 may store reconstructed reference frames that may be used by the decoding engine during decompression to recover P-frames or I-frames. Specifically, reference picture cache 630 may store particular frames based on whether the frames have been marked as reference frames by an encoder such as the one described in FIG. 3.

Figure 7:
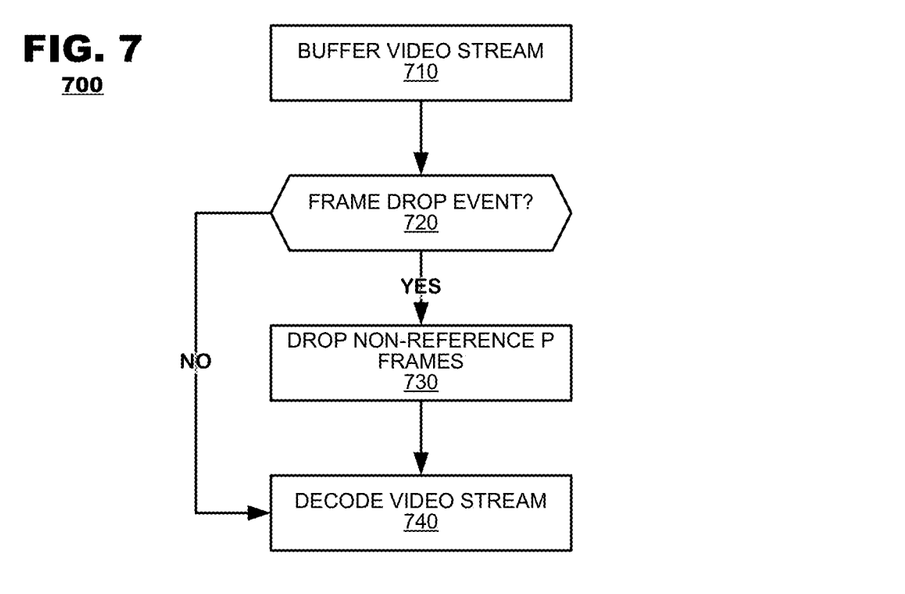
FIG. 7 illustrates a method for controlling the decoding of frames within a video decoder according to an embodiment of the invention.

FIG. 7 illustrates a method for controlling the decoding of frames within a video decoder according to an embodiment of the invention. According to the method, coded frames are read from an input buffer (box 710). The decoder may then determine whether some frames should be dropped (box 720). Based on the determination, non-reference P-frames (as marked by the encoder described in FIG. 3) may be dropped (box 730). The remaining frames may then be decoded (box 740).

The decoder may determine that some coded frames may have to be dropped (i.e., discarded without decoding) based on factors such as network congestion and/or the ability of the decoder to handle frames at the current rate. For example, in an embodiment, the coder may code the video stream at a particular number of frames per second, for example, 60 frames per second (fps), marking every other frame as a reference frame (i.e., the threshold distance may be set to 2 frames as explained in FIG. 5). However, the decoder may need to output the video stream at a lower frame rate, for example, 30 fps. To do so, the decoder may drop the frames marked as non-reference frames, and then decode the remaining frames.

Figure 8:
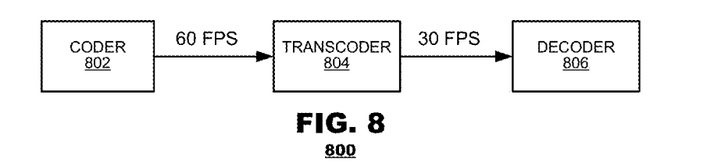
FIGS. 8 and 9 illustrate transcoding a video stream in an exemplary embodiment of the invention.
Figure 9:
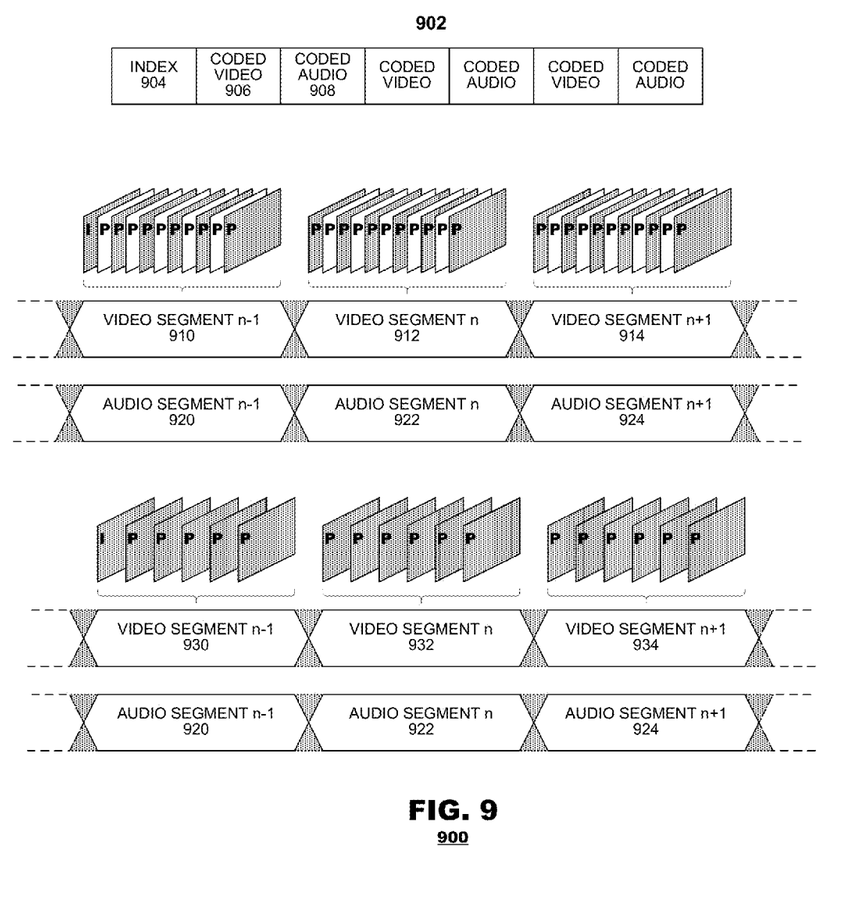

Embodiments of the present invention allow for simply transcoding coded video at different frame rates. FIGS. 8 and 9 show transcoding according to such embodiments. A coder 802 may encode a video stream as discussed in FIG. 4. The coder 802 may code the frames at a particular number of frames per second. The coded video and associated audio may be sent to a transcoder 804, for example, via a channel. The transcoder 804 may drop non-reference P-frames and reduce the frame rate of the video stream, and send the video and associated audio to a decoder 806 via another channel.

In an embodiment, the coder 802 may mark select frames as reference frames based on an operative threshold distance and operative frame rate. The coded video may be combined with corresponding elements of an audio stream to form a channel stream, which may be sent to the transcoder 804. The channel stream may identify associations between elements of the video stream and corresponding elements of the audio stream via an index 904. The transcoder 804 may convert the incoming video to a lower frame rate, as needed, by dropping non-reference frames. Therefore, transcoder 804 may drop the non-reference P-frames from video segments 910, 912, and 914, combine the remaining frames into a lower frame rate video stream consisting of video segments 930, 932, and 934 respectively, and re-associate the corresponding elements of the audio stream (920, 922, and 924) with the remaining frames via an index to form the modified channel stream. The transcoder 804 may then transmit the modified channel stream to another component such as a decoder 806.

Figure 10:
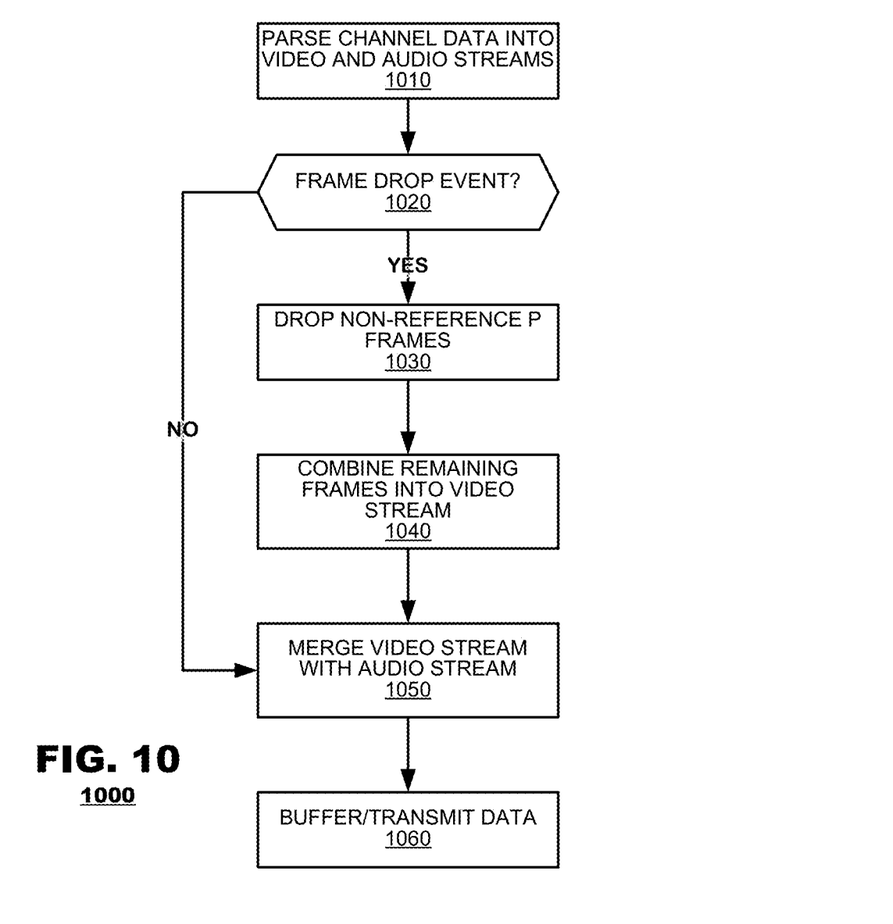
FIG. 10 illustrates a method of transcoding frames in an embodiment of the invention.

FIG. 10 illustrates a method of transcoding frames in an embodiment. According to the method, channel data sent by an encoder may be parsed into video and audio streams (box 1010). A transcoder may determine whether frames should be dropped based on factors such as network congestion and/or the ability of the next component to handle frames at the current rate (box 1020). If there is a frame drop event, non-reference P-frames (as marked by the encoder described in FIG. 5) may be dropped (box 1030). The remaining frames may be combined to form a modified video stream (box 1040), and the modified video stream may be merged with the audio stream (box 1050), and then buffered/transmitted (box 1060). If there is no frame drop event, the original video stream may be re-merged with the audio stream (box 1050), and then buffered/transmitted (box 1060).

The foregoing discussion has described operation of the embodiments of the present invention in the context of coders and decoders. Commonly, video coders are provided as electronic devices. They can be embodied in integrated circuits, such as application specific integrated circuits, field programmable gate arrays and/or digital signal processors. Alternatively, they can be embodied in computer programs that execute on personal computers, notebook or tablet computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronic devices, such as gaming systems, smartphones, DVD players, portable media players and the like, and they also can be packaged in consumer software applications such as video games, browser-based media players and the like.

Several embodiments of the invention are specifically illustrated and/or described herein. However, it will be appreciated that modifications and variations of the invention are covered by the above teachings and within the purview of the appended claims without departing from the spirit and intended scope of the invention.

I claim:

1. A method, comprising:
    coding frames of video in a sequence according to motion estimation prediction in which each frame of the video is constrained to be coded as one of an I-frame or a P-frame;
    for each coded P-frame, determining a distance from the respective P-frame to a most-recently coded reference frame in the coded sequence;
    based on the determination, when the distance matches a uniform threshold distance which varies based on an estimate of processing load at a decoder, marking the respective P-frame as a reference frame of the coded sequence;
    transmitting coded video data of the I-frame(s), the reference P-frames and non-reference P-frames in a channel;
    decoding coded video data of the I-frame(s) and the reference P-frames of the coded sequence; and
    storing decoded video data of the I-frame(s) and the reference P-frames of the coded sequence in a reference picture cache for use in subsequent encoding of other frames of the video sequence.

2. The method of claim 1, wherein the distance threshold is two frames.

3. The method of claim 1, wherein the distance threshold further varies based on an estimate of congestion in the channel.

4. The method of claim 1, wherein the coding of the each P-frame further comprises:
predicting data of the each P-frame with reference to the most recently coded reference frame.

5. The method of claim 1, further comprising applying error correction coding to the coded frame data, wherein error correction coding of reference P-frames is applied at a greater strength than error correction coding of non-reference P-frames.

6. The method of claim 1, wherein the estimated decoder processing load is derived from a report of processing load received by an encoder from the decoder.

7. The method of claim 1, wherein the estimated decoder processing load is derived by an encoder from data representing processing resources at the decoder.

8. A coding apparatus, comprising:
a coding engine to code frames of video in a sequence according to motion estimation prediction in which each frame of the video sequence is constrained to be coded as one of an I-frame or a P-frame;
a controller to determine for each coded P-frame, a distance from the respective P-frame to a most-recently coded reference frame in the coded sequence, wherein, based on the determination, when the distance matches a uniform threshold distance which varies based on an estimate of processing load at a second decoder, the respective P-frame is marked as a reference frame of the coded sequence by the coding engine;
a transmit buffer to transmit coded video data of the I-frame(s), the reference P-frames and non-reference P-frames of the coded sequence in a channel;
a first decoder to decode coded video data of the I-frame(s) and the reference P-frames; and
a reference picture cache to store decoded video data of the I-frame(s) and the reference P-frames of the coded sequence for use in subsequent encoding of other frames of the video sequence.

9. The apparatus of claim 8, wherein the distance threshold is two frames.

10. The apparatus of claim 8, wherein the distance threshold further varies based on an estimate of congestion in the channel.

11. The apparatus of claim 8, further comprising:
an error correction unit to apply error correction coding to the coded frame data, wherein error correction coding of reference P-frames is applied at a greater strength than error correction coding of non-reference P-frames.

12. The apparatus of claim 8, further comprising:
a predictor to predict data of each coded P-frame with reference to the most recently coded reference frame.

13. The apparatus of claim 8, wherein the estimated decoder processing load is derived from a report of processing load received by the coding engine from the second decoder.

14. The apparatus of claim 8, wherein the estimated decoder processing load is derived by the coding engine from data representing processing resources at the second decoder.

15. A physical computer readable medium storing program instructions that, when executed by a processor, cause the processor to:
code frames of video in a sequence according to motion estimation prediction in which each frame of the video sequence is constrained to be coded as one of an I-frame or a P-frame;
for each coded P-frame, determine a distance from the respective P-frame to a most-recently coded reference frame in the coded sequence;
based on the determination, when the distance matches a uniform threshold distance which varies based on an estimate of processing load at a decoder, marking the respective P-frame as a reference frame of the coded sequence;
transmit coded video data of the I-frame(s), the reference P-frames and non-reference P-frames in a channel;
decode coded video data of the I-frame(s) and the reference P-frames of the coded sequence; and
store decoded video data of the I-frame(s) and the reference P-frames of the coded sequence in a reference picture cache for use in subsequent encoding of other frames of the video sequence.

16. The computer readable medium of claim 15, wherein the distance threshold is two frames.

17. The computer readable medium of claim 15, wherein the distance threshold further varies based on an estimate of congestion in the channel.

18. The method of claim 1, wherein the transmitting comprises:
during a non-congested state, transmitting the I-frame(s), the reference P-frames, and non-reference P-frames of the coded sequence in a channel; and
during a congested state, dropping the non-reference P-frames of the coded sequence, and transmitting remaining I-frame(s) and remaining reference P-frames of the coded sequence in the channel.

19. The method of claim 18, wherein following the dropping, the remaining frames have uniform temporal spacing with each other.

20. The method of claim 18, wherein the dropping occurs in response to a processing load of a decoder.

21. The method of claim 18, wherein the dropping occurs responsive to a frame rate of the coded video sequence being incompatible with a decoder.

* * * * *